United States Patent [19]

Izuka et al.

[11] Patent Number: 4,986,938
[45] Date of Patent: Jan. 22, 1991

[54] PROCESS FOR PRODUCING PLASTIC SUBSTRATE FOR OPTICAL DISKS

[75] Inventors: Akihiro Izuka; Yoshio Onizawa, Hyogo; Mitsuru Yamashita, all of Himeji, Japan

[73] Assignee: Daicel Chemical Industries Ltd., Osaka, Japan

[21] Appl. No.: 338,834

[22] Filed: Apr. 14, 1989

Related U.S. Application Data

[62] Division of Ser. No. 19,720, Feb. 27, 1987, Pat. No. 4,841,501.

[30] Foreign Application Priority Data

Mar. 3, 1986 [JP] Japan ................................. 61-45900

[51] Int. Cl.$^5$ ..................... B29D 11/00; B29C 45/03
[52] U.S. Cl. ..................................... 264/1.3; 264/1.9; 264/40.2; 264/106; 264/328.13; 264/328.7
[58] Field of Search ................ 264/1.3, 1.9, 106, 40.2, 264/328.13, 328.7

[56] References Cited

U.S. PATENT DOCUMENTS 4,707,321 11/1987 Segawa et al. ................... 264/328.7
4,764,331 8/1988 Tokuhara et al. ................. 264/106
4,828,769 5/1989 Manus et al. ...................... 264/1.3

Primary Examiner—James Lowe
Attorney, Agent, or Firm—Armstrong, Nikaido, Marmelstein, Kubovcik, & Murray

[57] ABSTRACT

A recording medium for optical high-density data storage and retrievel, comprising a flat transparent plastic substrate characterized by the following relationship between the refractive index ($n_z$) in the direction perpendicular to the flat surfaces of the transparent substrate, and the refractive indexes ($n_x$) and ($n_y$) in the direction parallel to the flat surfaces of the transparent substrate:

$|n_z - n_x|$ smaller than $4 \times 10^{-4}$; and
$|n_z - n_y|$ smaller than $4 \times 10^{-4}$.

The recording medium is produced by an injection molding process wherein the pressure on the molten resin filled into the molding cavity of a mold is decreased or increased, as appropriate, in order to maintain the desired differences between the refractive index $n_z$ in the direction perpendicular to the flat surfaces of the transparent substrate, and the refractives indexes ($n_x$) and ($n_y$) in the direction parallel to the flat surfaces of the transparent substrate.

8 Claims, 1 Drawing Sheet

PROCESS FOR PRODUCING PLASTIC SUBSTRATE FOR OPTICAL DISKS

This is a division of application Ser. No. 019,720 filed Feb. 27, 1987, now U.S. Pat. No. 4,841,501.

BACKGROUND OF THE INVENTION (1) Field of the Invention

The present invention relates to a recording medium such as optical disk, optical card, and optical tape and to a process for producing the same. More particularly, the present invention relates to an improvement of a transparent plastic substrate to support the data layer. More specifically, the present invention relates to a transparent plastic substrate that can be applied to the magneto-optical recording medium and to a process for producing the same.

(2) Description of Related Art

A problem encountered in the optical high-density data recording medium designed to record and retrieve submicron-sized data spots by means of a laser beam passing through a transparent substrate is a higher value of the birefringence of the transparent substrate. A recording medium having a high value of birefringence has such a low CN ratio that it is of no practical use, particularly in the case of recording medium such as magneto-optical recording medium which is designed such that the reading of data is accomplished by detecting the change of the plane of polarization which is as small as 0.1 to 0.3 degrees. The transparent substrate should preferably be produced by injection molding from polycarbonate resin because of its low cost and its resistance to change by water absorption. Polycarbonate resin, however, has a disadvantage that the birefringence is high.

The present inventors already disclosed that it is possible to greatly reduce the birefringence of the injection-molded substrate of polycarbonate by improving the molding conditions. (Japanese Patent Application No. 12565-1984 or Japanese Patent Laid-open No. 155424/1985) In their continued researches, they found that the birefringence of the plastic substrate takes place not only in the direction parallel to the flat surface of the substrate (as believed previously) but also in the direction perpendicular to the flat surface, and that the birefringence in the latter direction strongly affects the CN ratio. These findings led to the present invention.

According to the conventional method for measuring the birefringence, the linearly polarized light is sent perpendicularly to the surface of the substrate and consequently the birefringence in the direction perpendicular to the surface of the substrate is not observed. However, if the linearly polarized light is sent aslant (say 30°) with respect to the surface of the substrate, the transmitted light emerges from the crossed nicols. This phenomena cannot be explained on the hypothesis that there is the birefringence only in the direction parallel to the surface of the substrate; but it can be explained if an assumption is made that there is the birefringence also in the direction perpendicular to the surface of the substrate. The detailed investigation revealed that the substrate made of polycarbonate resin has the optical anisotropism characterized by the refractive index $n_z$ in the direction perpendicular to the surface of the substrate and the refractive indexes $n_x$ and $n_y$ parallel to the surface of the substrate. In general, the absolute value of the difference between $n_x$ and $n_y$ is almost equal to 0; but the absolute values of the difference between $n_z$ and $n_x$ and between $n_z$ and $n_y$ are not equal to 0. The absolute values ranges from 0.0005 to 0.0006. This means that in the case of a 1.2 mm thick optical disk there occurs a retardation of 600–780 nm in the sectional direction.

It is not known yet why the polycarbonate substrate has the same optical anisotropism as the biaxial crystal. It is apparent, however, that the optical anisotropism is attributable to the orientation of resin molecules that takes place in the mold cavity. This is explained with reference to FIG. 1 which schematically shows the behavior of molten resin in the mold cavity. The molten resin 3 receives the shear stress in the radially inward direction from the mold surfaces 1 and 2 and the radially outward force exerted by the injection pressure. Therefore, the molten resin receives three forces along the thickness direction of the mold cavity that bring about orientation in the radially inward direction, in the thickness direction, and in the radially inward direction simultaneously. The regions in which these forces are exerted are indicated by A, B, and A, respectively, in FIG. 1. It is not known which region affects which of the three refractive indexes $n_z$, $n_x$, and $n_y$; but it is believed that there are three regions in which the direction of orientation varies in the thickness direction of the substrate.

The present inventors hypothesized that it would be necessary to control the orientation in the above-mentioned region B in order to lower the high birefringence which is one of the causes that aggravate the CN ratio of a polycarbonate resin substrate. And they carried out a series of experiments based on the hypothesis to complete the present invention. The disk substrate of the present invention which has specific refractive indexes had not existed before the present disclosure, because it was impossible to determine the effect of the refractive index $n_z$ in the direction perpendicular to the surface of the substrate so long as the birefringence was measured by the conventional method, i.e., by sending the linearly polarized light perpendicularly to the surface of the substrate.

SUMMARY OF THE INVENTION

Accordingly, it is an object of the present invention to provide a recording medium having a high CN ratio which can be used for the optical high-density data recording system. More particularly, it is an object of the present invention to provide a recording medium having a high CN ratio which is based on a polycarbonate resin substrate formed by injection molding.

DESCRIPTION OF THE PREFERRED EMBODIMENTS

There is provided a recording medium for the optical high-density data storage and retrieval system designed to record and/or read data by means of an incident laser beam passing through a flat transparent plastic substrate, characterized in that the absolute values of the difference between the refractive index ($n_z$) in the direction perpendicular to the flat surface of the transparent plastic substrate and the refractive indexes ($n_x$) and ($n_y$)

in the direction parallel to the flat surface, that is, $|n_z-n_x|$ and $|n_z-n_y|$ are smaller than $4\times10^{-4}$.

The above-mentioned optical high-density data recording/retrieving system per se is known well. The system is designed to record and retrieve data by using a laser beam as thin as about 1 μm. Usually it employs a discoid recording medium. The data are written in the form of pits on one side of the transparent plastic substrate when the substrate is molded, or the data are written by the user after the substrate has been molded. In the latter case, data are written on the Te-based DRAW film or the TbFeCo-based E-DRAW film formed on the plastic substrate with or without track grooves or preformatted pits. The laser beam for writing and reading the data is sent through the transparent plastic substrate (So-called back-reading system. The recording medium of the invention can also be applied to the so-called front-reading system. In such a case, the recording medium is supported on a proper support and the laser beam is sent through the transparent plastic substrate of the invention arranged above the recording medium. In either systems, it is necessary that the transparent plastic substrate have as small birefringence as possible.

Figure 2:
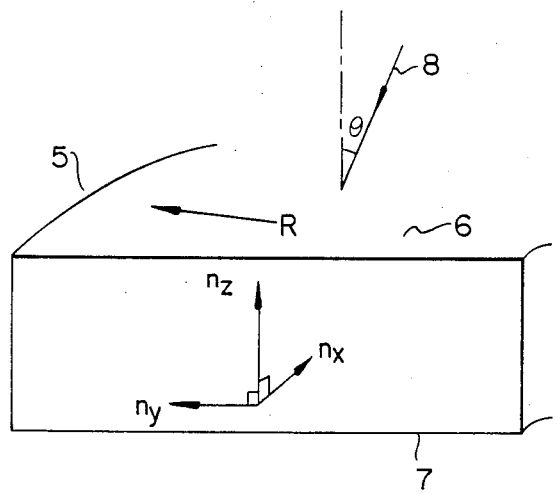
FIG. 2 is a schematic representation of the refractive indexes in the x, y, and z directions.

The refractive index $n_z$ in the direction perpendicular to the surface of the plastic substrata will be examined in the following. It is assumed that the transparent plastic substrate 5 has refractive indexes in three directions as shown in FIG. 2. They are refractive indexes $n_x$ and $n_y$ in the directions parallel to the flat surfaces 6 and 7 of the substrate and perpendicular to each other, and refractive index $n_z$ in the direction perpendicular to the flat surfaces 6 and 7. The birefringence attributable to $n_z$ was not measured by the conventional method, because the linearly polarized light was sent perpendicularly to the flat surfaces 6 and 7 to measure the birefringence. The present inventors observed the $n_z$ by sending the linearly polarized light 8 aslant (at an incident angle (θ) of 30°, for example) with respect to the flat surface 6. The measuring method is not explained in detail because it is the same as the conventional one except that the incident angle is inclined through 30° with respect to the substrate. The point is that the linearly polarized light is sent through the substrate at an incident angle of 30° and the intensity of the transmitted light is measured under crossed nicols.

The results of the experiments carried out by the present inventors indicate that $n_x$ equals $n_y$ in most cases. However, the absolute values $|n_z-n_x|$ and $|n_z-n_y|$ are much greater than the value of birefringence which has been believed in the past. These values are greater than 0.0005 in the case of substrates produced by the conventional injection molding method. If a magneto-optical recording film is formed on such a substrate, the resulting magneto-optical disk has a CN ratio of about 48 dB.

On the other hand, the CN ratio of the optical disk is increased to 51 dB if a magneto-optical recording film is formed on the substrate of the present invention which has the values $|n_z-n_x|$ and $|n_z-n_y|$ smaller than 0.0004. It is considered that the increase of CN ratio is attributable to the increase of $\theta_k$ (kerr rotation angle) and the decrease of noise level.

According to the present invention, there Is provIde In the second place a process for producing the recording medium having the abovementioned features. In other words, there is provided an improved process for producing a recording medium for the optical high-density data storage and retrieval system by molding a flat transparent plastic substrate through injection molding of a molten resin into a flat mold cavity made up of a pair of split molds and arranging on at least one side of the thus formed transparent plastic substrate a data layer to record and/or retrieve data by means of an incident laser beam passing through the transparent plastic substrate, wherein said improvement comprises decreasing or increasing the clamping pressure and/or holding pressure in a portion of the pressure-holding stage after the injection and filling stage of a molten resin into the mold cavity in order to release pressure from or apply pressure to the resin filled in the mold cavity so that the absolute values of the difference between the refractive index ($n_z$) in the direction perpendicular to the flat surface of the transparent plastic substrate and the refractive indexes ($n_x$) and ($n_y$) in the direction parallel to the flat surface, that is, $|n_z-n_x|$ and $|n_z-n_y|$ are smaller than $4\times10^{-4}$.

The resin that can be used for the process of the invention includes any resin that exhibits the anisotropism of refractive index as mentioned above. Preferable among them is polycarbonate resin, which has other advantageous features in addition to the anisotropism. The mold cavity used for the process has a dimension which varies according to the disk to be produced. The diameter is from about 3 cm to about 30 cm, and the thickness is from 1 mm to 2 mm, usually 1.2 mm. The molding machine is properly selected according to the dimensions of the disk. The molding operation is performed under the ordinary molding conditions for disk molding, except the special operation in the pressure-holding stage. For polycarbonate resin, the temperature of the injection cylinder is usually 300°–400° C., the mold temperature is about 90° C., and the injection speed of resin into the cavity is 10–500 ml/sec. These parameters vary depending on the dimensions of the disk and the kihd of the resin used. For more detail about the conditions of injection molding optical disks from polycarbonate resin, refer to Japanese Patent Application No. 155424/1985 filed by the present inventors.

Figure 1:
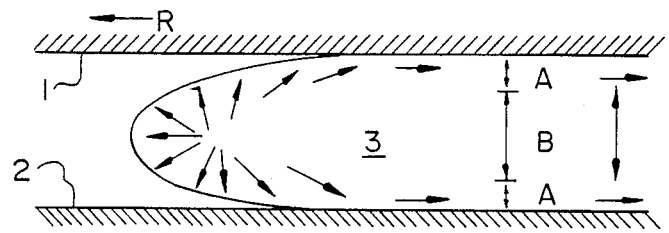
FIG. 1 is a schematic representation of the behavior of molten resin in a mold cavity.

According to the present invention, the process for producing the recording medium is characterized by decreasing or increasing the clamping pressure and/or holding pressure in at least a portion of the pressure-holding stage after the injection and filling stage of a molten resin into the mold cavity in order to release pressure from or apply pressure to the resin filled in the mold cavity. The selection of pressure release or pressure application should be properly made according to need. Whichever might be selected, the object is to relieve or disperse the orientation of the resin in the direction perpendicular to the surface as shown in FIG. 1. It is important that the pressure release or pressure application be made at least in a portion of the pressure-holding stage. In actual operation, it should be accomplished in the period starting immediately after the molten resin has been filled in the mold cavity by the injection stage which takes 1–2 seconds, and ending when the mold opening stage begins. The timing for pressure release or pressure application is properly selected in consideration of transferability of a relief pattern from a stamper. In other words, the timing is after the surface of the molten resin filled in the cavity has begun to solidify on contact with the cooled mold, but before the inside of the molten resin is not yet cooled. To be more specific, the pressure release or pressure application should preferably be performed while the region B (in FIG. 1) is not yet solidified. The pressure release to lower the holding pressure may be accomplished after the completion of injection by decreasing the clamping force to a great extent or to nearly zero or by retracting the injection screw or by the combination thereof. On the other hand, the pressure application may be accomplished by increasing the holding pressure again. The pressure release or pressure application should be accomplished before the resin in the region B substantially solidifies. Under certain circumstances, the pressure release and pressure application may be accomplished consecutively. The above-mentioned steps partly alleviate the molding strain and cooling strain, making it possible to produce the disk substrate having small values of $|n_z-n_x|$ and $|n_z-n_y|$.

The invention is now described with reference to examples that follow.

(EXAMPLE 1)

A disk substrate was produced from polycarbonate of 2,2-bis(4-hydroxydiphenyl)propane having an average molecular weight of 15,000 using a Dynamelter injection molding machine made by Meiki Seisakusho. The mold cavity measures 300 mm in diameter and 1.2 mm thick. To one side of the cavity is attached a stamper having 1.6-μm pitch track grooves.

The injection cylinder temperature was 340° C, the mold temperature was 90° C., the injection speed was 120 ml/sec, and the injection time was about 1.5 sec. The pressure release was started 0.2 seconds after the completion of injection, and it lasted for 5 sec until the clamping force decreased linearly from 200 tons to zero. Ten seconds later, the mold was opened and the disk substrate was demolded.

The refractive indexes of the thus obtained disk was measured by sending a linearly polarized light at an incident angle of 30° with respect to the surface of the disk. The value of $|n_z-n_y|$ was 0.0003, which is equivalent to 360 nm in terms of retardation. On this disk substrate was formed a magneto-optical recording layer of $Gd_{0.12}Tb_{0.12}Fe_{0.76}$ by sputtering in the usual way. The resulting optomagnetic disk was found to have a CN ratio of 51 dB.

On the other hand, the same procedure as above was repeated except that the step of pressure release was omitted. The value of $|n_z-n_y|$ was 0.0006. On this substrate was formed a magneto-optical recording layer in the same manner as above. The resulting magneto-optical disk was found to have a CN ratio of 48 dB.

This example demonstrated that the pressure release increases the CN ratio by 3 dB.

(EXAMPLE 2)

The same procedure as in Example 1 was repeated except that the step of pressure release was replaced by the step of pressure application. The pressure application was started 0.2 seconds after the completion of injection, and it lasted for 5 sec until the clamping force increased linearly from 150 tons to 250 tons.

The value of $|n_z-n_y|$ was 0.0004. On this substrate was formed a magneto-optical recording layer. The resulting magneto-optical disk was found to have a CN ratio of 50 dB.

Thus, this example demonstrated that the pressure application increases the CN ratio by 2 dB.

What is claimed is:

1. A process for molding a transparent plastic substrate for a recording medium, comprising the steps of:
    (a) injecting into a molding cavity a resin which possesses anisotropy of refractive index when solidified;
    (b) filling said molding cavity with the injected resin; and
    (c) increasing the pressure on the resin in the molding cavity after completion of the filling step and after the surface of the resin in the molding cavity has solidified but before the inside of the molten resin in the molding cavity has solidified, said pressure being increased sufficiently so as to obtain a molded transparent plastic substrate having two parallel flat surfaces wherein the absolute differences in the refractive indexes satisfy the following inequalities:
    $|n_z-n_x|<4\times10^{-4}$, and
    $|n_z-n_y|<4\times10^{-4}$, wherein $n_z$ is the refractive index in the direction perpendicular to the flat surfaces of the transparent plastic substrate, and $n_x$ and $n_y$ are the refractive indexes in the directions parallel to the flat surfaces of the transparent plastic substrate.

2. A process as in claim 1, wherein said resin is a polycarbonate.

3. A process for molding a transparent plastic substrate for a recording medium, comprising the steps of:
    (a) injecting into a molding cavity a resin which possesses anisotropy of refractive index when solidified;
    (b) filling said molding cavity with the injected resin; and
    (c) releasing the pressure on the resin in the molding cavity after completion of the filling step and after the surface of the resin in the molding cavity has solidified but before the inside of the molten resin in the molding cavity has solidified, said pressure being released sufficiently so as to obtain a molded transparent plastic substrate having two parallel flat surfaces wherein the absolute differences in the refractive indexes satisfy the following inequalities:
    $|n_z-n_x|<4\times10^{-4}$, and
    $|n_z-n_y|<4\times10^{-4}$, wherein $n_z$ is the refractive index in the direction perpendicular to the flat surfaces of the transparent plastic substrate, and $n_x$ and $n_y$ are the refractive indexes in the directions parallel to the flat surfaces of the transparent plastic substrate.

4. A process as in claim 3, wherein said resin is a polycarbonate.

5. An improvement in a process for manufacturing a recording medium which comprises a recording layer provided on a transparent plastic substrate, said improvement comprising molding said transparent plastic substrate by the steps of:
    (a) injecting into a molding cavity a resin which possesses anisotropy of refractive index when solidified;
    (b) filling said molding cavity with the injected resin;
    (c) increasing the pressure on the resin in the molding cavity after completion of the filling step and after the surface of the resin in the molding cavity has solidified but before the inside of the molten resin in the molding cavity has solidified, said pressure being increased sufficiently so as to obtain a molded transparent plastic substrate having two parallel flat surfaces wherein the absolute differences in the refractive indexes satisfy the following inequalities:

$|n_z - n_x| < 4 \times 10^{-4}$, and
$|n_z - n_y| < 4 \times 10^{-4}$, wherein $n_z$ is the refractive index in the direction perpendicular to the flat surfaces of the transparent plastic substrate, $n_x$ and $n_y$ are the refractive indexes in the directions parallel to the flat surfaces of the transparent plastic substrate.

6. A process as in claim 5, wherein said recording layer is a magneto-optical recording layer.

7. An improvement in a process for manufacturing a recording medium which comprises a recording layer provided on a transparent plastic substrate, said improvement comprising molding said transparent plastic substrate by the steps of:

(a) injecting into a molding cavity a resin which possesses anisotropy of refractive index when solidified;

(b) filling said molding cavity with the injected resin;

(c) releasing the pressure on the resin in the molding cavity after completion of the filling step and after the surface of the resin in the molding cavity has solidified but before the inside of the molten resin in the molding cavity has solidified, said pressure being released sufficiently so as to obtain a molded transparent plastic substrate having two parallel flat surfaces wherein the absolute differences in the refractive indexes satisfy the following inequalities:

$|n_z - n_x| < 4 \times 10^{-4}$, and
$|n_z - n_y| < 4 \times 10^{-4}$, wherein $n_z$ is the refractive index in the direction perpendicular to the flat surfaces of the transparent plastic substrate, $n_x$ and $n_y$ are the refractive indexes in the directions parallel to the flat surfaces of the transparent plastic substrate.

8. A process as in claim 7, wherein said recording layer is a magneto-optical recording layer.

* * * * *